Figure 5:
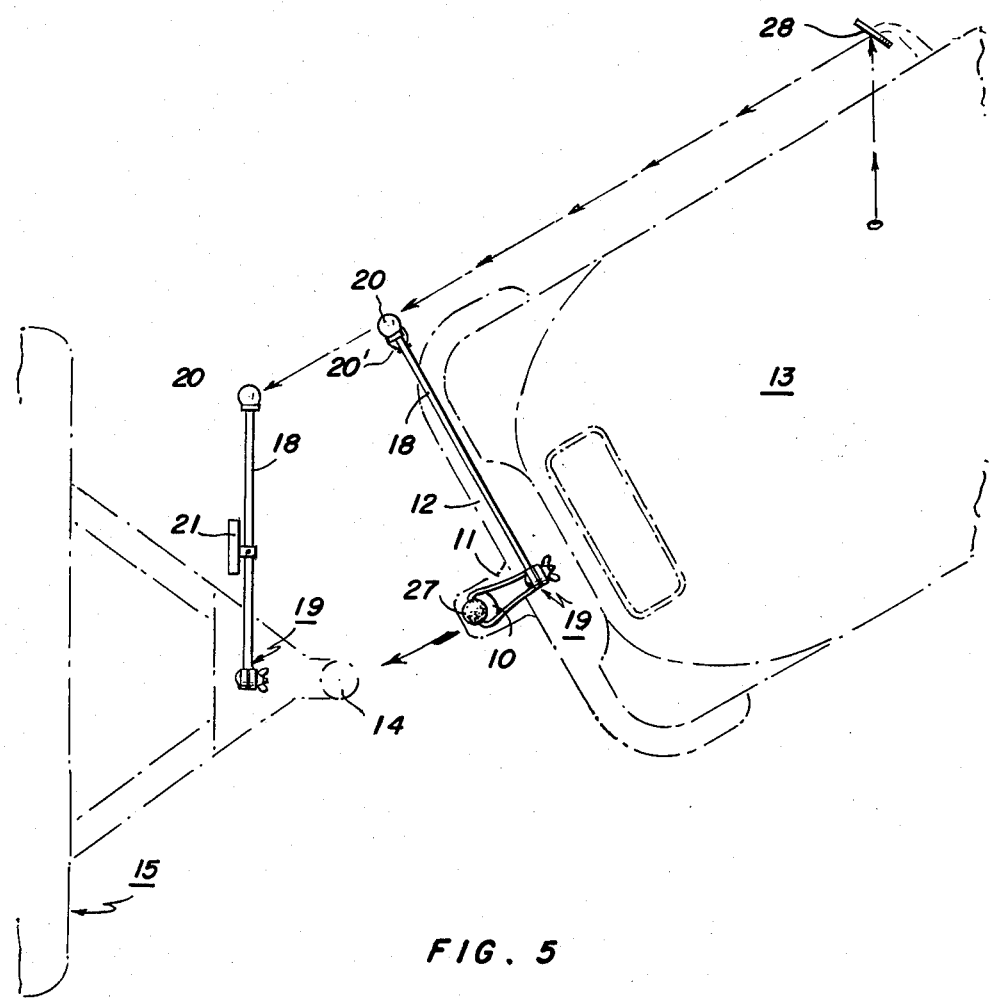

May 16, 1961
O. E. HAMILTON
2,984,011
TRAILER ALIGNMENT DEVICE
Filed Aug. 2, 1957
2 Sheets-Sheet 1
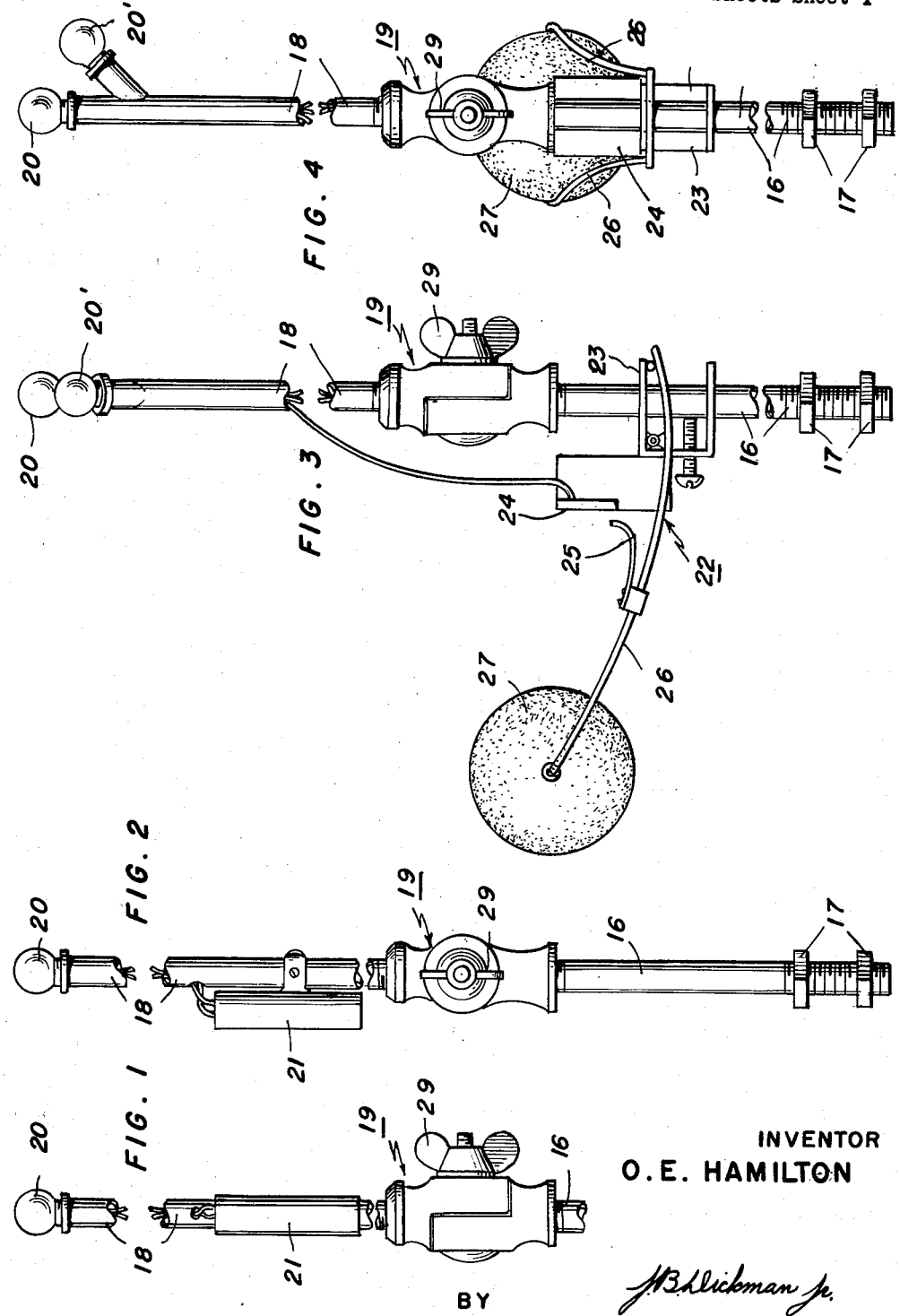
INVENTOR
O. E. HAMILTON
BY
ATTORNEY May 16, 1961     O. E. HAMILTON     2,984,011
TRAILER ALIGNMENT DEVICE Filed Aug. 2, 1957     2 Sheets-Sheet 2

INVENTOR
O. E. HAMILTON

BY *J B Hickman jr.*
ATTORNEY

United States Patent Office 2,984,011
Patented May 16, 1961

2,984,011

TRAILER ALIGNMENT DEVICE

Oscar E. Hamilton, P.O. Box 11, Blairsden, Calif.

Filed Aug. 2, 1957, Ser. No. 676,026

1 Claim. (Cl. 33—46)

This invention relates to towed vehicle hitching guide means which may be used in conjunction with a rear view mirror on the driver's side of the vehicle to enable him to properly steer the towing vehicle while backing up to line up the hitching parts on the towing vehicle with those on the towed vehicle, so that they may be coupled together preparatory to towing.

The object of the present invention is to make it unnecessary for the driver of a towing vehicle to look backward and stretch to try to observe the approach of the hitching parts on the two vehicles being coupled while endeavoring to properly steer his vehicle backward to bring these parts into alignment for coupling together.

Another object is to obviate the necessity of having an accomplice observer to watch the approach of the hitching parts above mentioned and to relay instructions for the steering operation to the driver.

Another object is to enable the driver to perform the coupling operation above referred to by himself in the daytime or at night.

Another object is to provide the hitching parts with guide posts extending to the side of each vehicle and having guide points lined up with a rear view mirror on the driver's side of the towing vehicle when the two vehicles are normally coupled together.

Another object is to make these posts adaptable for mounting and adjustment on any towed vehicle and any towing vehicle to properly position the guide points for all vehicles in any fleet.

Another object is to make these posts angularly adjustable to bring the guide points into alignment normally with the normal horizontal beam from the rear view mirror as reflected to the driver when sitting in his normal driving position.

Other and more specific objects of the present invention will become apparent in the following detailed description of one form of the guide means as illustrated in the accompanying drawings, wherein:

Figs. 1 and 2 are side and front views of the guide post assembly for the towed vehicle part of the hitching means, Figs. 3 and 4 are side and front views of the guide post assembly for the towing vehicle part of the hitching means, and Fig. 5 is a schematic outline view in plan showing the guide posts mounted in proper adjustment on the hitching means to show how they enable a driver to easily perform the steering operation by himself to bring the two parts of the coupling into alignment.

While these hitching guide means are adaptable to any type of hitching means, they are here illustrated applied to a ball and socket coupling type of towing hitches, wherein the ball 10 is mounted upright on a rearwardly projecting platform 11 from the rear cross member 12 of the towing vehicle 13, and the socket 14 mounted on the towed vehicle 15, extends forwardly to fit over the ball 10.

Small trailers present no problem in making a coupling to a towing vehicle, because they can be manually pulled up behind the towing vehicle and readily hitched thereto. However, with large trailers or towed vehicles of substantial size, it has been customary to leave the socket end of the vehicle propped up when disconnecting the coupling, and when the vehicle is again ready for hauling, a towing vehicle would be backed up to it to place the ball portion of the hitch under the socket end of the hitch on the towed vehicle, so that the socket could be lowered over the ball and the coupling locked against accidental disconnection in transit. In the backing operation it was necessary for the driver to move from his normal driving position to be able to observe the progress of the backing operation, or to have an accomplice observing this progress and relaying his observations to the driver and directing his steering manipulation of the towing vehicle so as to align the ball under the socket.

The present guide means permits the driver to remain in his normal driving position and perform this backing operation easily and quickly without any assistance from an accomplice.

The guide means consist of a front and rear guide post assembly. Each post assembly is composed of a base portion which may be a rod or pipe 16 having means such as the nuts 17 on its lower threaded end adapted for mounting on the vehicle, and a rod or pipe portion 18 connected to the top of pipe 16 by means of an adjustable pivot 19. A light 20, preferably green, is mounted at the outer tip of each pivoted portion 18 to serve as a guide point.

The rear guide post, which is adapted for mounting on the towed vehicle portion of the hitch, may be provided with a flash light battery in a battery clip 21 to provide the current for the light 20 serving as the rear guide point.

The front guide post, which is adapted for mounting on the towing vehicle, may be wired up to the electric supply circuits normally used in the towing vehicle, to supply current to the guide light 20. The front guide post is further provided with a signal light 20', preferably red, which is also wired to the vehicle supply current in series with a switch 22 mounted by means of a bracket 23 on the pipe 16. Switch 22 has a stationary contact 24 wired in series with the signal light, and a grounded rockable spring contact 25 fixed to the arms 26 which are pivoted to the switch bracket 23 and support a feeler ball 27 at their outer ends. The ball 27 may be rotatably supported on the connecting bar between the ends of the arms 26. The switch is adjusted so that the arms extend over the ball 10 of the coupling, and ball 27 at the end of these arms will roll up over the top of the socket portion of the hitch on the towed vehicle when the towing vehicle is backed into proper hitching position.

In adjusting the guide points into proper guiding positions on their respective vehicles, after the front guide post is mounted on the rear of the towing vehicle by fixing the lower end of pipe 16 in a suitable bore in the platform 11, so that the pivot 19 operates in a transverse vertical plane, its guide point light 20 is swung out to the side of the vehicle down to a height substantially on the level of the rear view mirror 28 on the driver's side. The pivot 19 is then locked in this adjustment by means of the clamp bolt and thumb nut 29.

The rear guide post is mounted on the towed vehicle by fixing it in a similar manner to the rear portion of the hitch, and its guide point light 20 is swung out to the corresponding height on the side of the towed vehicle when normally propped up disconnected from the towing vehicle.

This adjustment of the two guide point lights will place them in alignment in the rear view mirror as viewed by the driver from his driving position only as long as the longitudinal axis of his towing vehicle is lined up with the socket 14.

Thus, if he maintains this axis alignment with the socket 14 by maintaining the guide points in alignment as he backs up his vehicle, the feeler ball 27 is bound to strike and roll up over the top of the socket 14 to close the switch 22 and light the signal light 20' which the driver sees alongside of the guide points when it lights up, to indicate that he has arrived at the proper hitching position, and to provide a warning for him to immediately stop his vehicle.

The adapting operation necessary in fastening the present guide means to the towed and towing vehicles is to drill a suitable hole in the tongue of the towed vehicle behind the socket for the rear post assembly, and a similar hole in the rear frame of the towing vehicle in front of the ball portion of the hitch.

The guide post portions may be pipes or solid rods as may be desired.

Instead of using the side mirror the driver may prefer to use the interior rear view mirror, in which case the rods 18 may be swung vertically to bring the guide points on the vertical axial plane of the vehicles substantially to the level of the interior rear view mirror.

Many obvious modifications in the details and arrangement of the parts of these guide means may be made without departing from the spirit and scope of this invention, as defined in the appended claim.

What is claimed is:

In combination with a towing vehicle having one part of a hitching means on its rear end and a trailer having another part of the hitching means on its front end arranged to be lined up with the part of the hitching means of the towing vehicle to couple the trailer with the towing vehicle; guide posts for indicating when the two parts of the hitching means are in vertical alignment as the towing vehicle is backed toward the front of the trailer, said guide posts including a first member attached to the rear portion of the towing vehicle and extending laterally therefrom and having its outer end provided with a guide light disposed at the side of the towing vehicle at a height substantially on the level of a rear view mirror on the driver's side of the towing vehicle whereby said guide light is disposed at a position so as to be visible in the rear view mirror of the towing vehicle as reflected to a driver seated in a normal driving position, a second member attached to the trailer and extending laterally therefrom and having its outer end provided with a guide light disposed at the side of the trailer at a height corresponding substantially with the height of the guide light on the towing vehicle when the trailer is normally propped up disconnected from the towing vehicle whereby the two guide lights are arranged in alignment in the rear view mirror as viewed by the driver from his driving position only as long as the axis of the towing vehicle is lined up with the part of the hitching means on the front end of the trailer, a signal light on the guide post of the towing vehicle adjacent to its guide light, a switch on said guide post of the towing vehicle for controlling illumination of said signal light, movable switch arms for said switch, and a feeler element carried by said switch arms for actuating said switch to effect illumination of said signal light, said feeler element being disposed above the hitching part of said towing vehicle in vertical alignment therewith and arranged to contact the top of the part of the hitching means on the trailer when the towing vehicle is backed into proper hitching position in which the hitching parts are located in vertical alignment for interconnection.

References Cited in the file of this patent

UNITED STATES PATENTS

| | | |
|---|---|---|
| 1,027,711 | Ette | May 28, 1912 |
| 1,300,104 | Arel | Apr. 8, 1919 |
| 1,771,817 | Ragsdale | July 29, 1930 |
| 2,091,101 | Moss | Aug. 24, 1937 |
| 2,121,525 | Johnson | June 21, 1938 |
| 2,233,838 | Garland | Mar. 4, 1941 |
| 2,243,497 | Bougie | Mar. 27, 1941 |
| 2,454,896 | Traub | Nov. 30, 1948 |
| 2,522,105 | Eisenman | Sept. 12, 1950 |
| 2,736,885 | Thompson | Feb. 28, 1956 |
| 2,797,406 | Tanis et al. | June 25, 1957 |
| 2,815,732 | Majors | Dec. 10, 1957 |
| 2,827,704 | Hunsicker | Mar. 25, 1958 |
| 2,834,002 | Nordsiek | May 6, 1958 |

FOREIGN PATENTS

| | | |
|---|---|---|
| 560,753 | Germany | Oct. 6, 1932 |